(12) United States Patent
Singh et al.

(10) Patent No.: US 7,870,270 B1
(45) Date of Patent: Jan. 11, 2011

(54) METHODS AND SYSTEMS FOR PROVIDING CAPABILITY MANAGEMENT AND USER ADMINISTRATION

(75) Inventors: Amit Singh, Irving, TX (US); Roopa Kotha, Irving, TX (US); Pichappan Pethachi, Tampa, FL (US); Fariborz Ebrahimi, Arlington, VA (US); Miguel Quiroga, Granbury, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 1064 days.

(21) Appl. No.: 10/898,110

(22) Filed: Jul. 23, 2004

Related U.S. Application Data (60) Provisional application No. 60/489,988, filed on Jul. 25, 2003.

(51) Int. Cl.
*G06F 15/16* (2006.01)
*G06F 15/173* (2006.01)

(52) U.S. Cl. .............. 709/229; 709/224; 709/225; 709/219

(58) Field of Classification Search ........... 709/224, 709/225, 229, 219
See application file for complete search history.

(56) References Cited

U.S. PATENT DOCUMENTS

| | | | | |
|---|---|---|---|---|
| 5,911,143 A | * | 6/1999 | Deinhart et al. | 707/103 R |
| 6,161,139 A | * | 12/2000 | Win et al. | 709/225 |
| 6,308,173 B1 | * | 10/2001 | Glasser et al. | 707/9 |
| 6,662,231 B1 | * | 12/2003 | Drosset et al. | 709/229 |
| 6,816,906 B1 | * | 11/2004 | Icken et al. | 709/229 |
| 6,931,402 B1 | * | 8/2005 | Pereira, III | 1/1 |
| 6,976,078 B1 | * | 12/2005 | Icken et al. | 709/229 |
| 7,089,319 B2 | * | 8/2006 | Lysenko et al. | 709/231 |

* cited by examiner

*Primary Examiner*—Saleh Najjar
*Assistant Examiner*—Edward J Kim (57) ABSTRACT

Providing capabilities management and user administration may include assigning a first profile including at least one role to a first user, the first profile having a first privilege comprising a first function and having a corresponding first target role set comprising at least one role. In addition, providing capabilities management and user administration may include assigning a second profile comprising at least one role to a second user. Furthermore, providing capabilities management and user administration may include providing the first user the ability to perform the first privilege on the second user if each role in the second profile has a corresponding matching role in the first target role set.

10 Claims, 5 Drawing Sheets

| Users | Profile |
|---|---|
| U1 | r4 |
| U2 | r1, r2, r3 |
| U3 | r1, r2 |

FIG. 4

| Role | Privileges | | | | | | | |
|---|---|---|---|---|---|---|---|---|
| | Privilege One | | Privilege Two | | Privilege Three | | Privilege Four | |
| | Target Role Set | Function | Target Role Set | Function | Target Role Set | Function | Target Role Set | Function |
| r4 | r1, r2 | Add | r1, r2 | Edit | r1, r2, r3 | View | r1 | Delete |

METHODS AND SYSTEMS FOR PROVIDING CAPABILITY MANAGEMENT AND USER ADMINISTRATION

CROSS REFERENCE TO RELATED APPLICATIONS

This application claims the benefit of U.S. Provisional Patent Application Ser. No. 60/489,988, filed Jul. 25, 2003, the disclosure of which is expressly incorporated herein by reference.

This application is related to U.S. patent application Ser. No. 10/898,111, filed on even date herewith in the name of Tao Yang et al. and entitled METHODS AND SYSTEMS FOR PROVIDING DATA FORM MANAGEMENT; and U.S. patent application Ser. No. 10/897,744, filed on even date herewith in the name of Amit Singh et al. and entitled METHODS AND SYSTEMS FOR PROVIDING A DATA ACCESS LAYER, both assigned to the assignee of the present application, the disclosures of which are expressly incorporated herein by reference.

BACKGROUND INFORMATION

Each of the past three centuries has been dominated by a single technology. The eighteenth century included great mechanical systems ushering in the industrial revolution. The nineteenth century saw the steam engine's development. During the twentieth century, the key technology was information gathering, processing, and distribution. Other developments include worldwide telephone networks, radio and television, the birth and unprecedented growth in the computer industry, and communication satellites.

At the beginning of the twenty-first century, these areas are rapidly converging, and the differences between collecting, transporting, storing, and processing information are quickly disappearing. For example, enterprises with hundreds of offices spread over a wide geographical area routinely expect to inspect the current status of even their most remote office at the push of a button. As capabilities to gather, process, and distribute information grow, the demand for even more sophisticated information processing grows faster.

As a result of these advancing technologies, a need to control user access to application/system capabilities and information systems has developed. For example, a basic requirement for any system that stores sensitive customer data may include data security. The permissions and privileges of any user in such a system may depend on the user's designation and responsibilities in a business process, for example. Many e-commerce systems have developed control mechanisms for their needs with the logic to control access firmly set to address specific business scenarios including specific players and roles. Conventional systems, however, do not sufficiently address the dynamic access control requirements of a generic tool that can be used to automate a business process.

Thus, there is a need for improved systems and methods for providing application capabilities management and user administration. For instance, there is a need to provide user administration where a user is associated with a profile comprising a plurality of roles while various roles are a respective set of application capabilities. Furthermore, there is a need for such improved systems and methods to address dynamic access control requirements including a generic tool that can be used to automate a business process.

SUMMARY

In accordance with the current invention, a capability management and user administration capability method and system are provided that avoid the problems associated with prior capability management and user administration methods and systems as discussed herein above.

In one aspect according to the present invention, a method for providing capabilities management and user administration comprises assigning a first profile including at least one role to a first user, the first profile having a first privilege comprising a first function and having a corresponding first target role set comprising at least one role, assigning a second profile comprising at least one role to a second user, and providing the first user the ability to perform the first privilege on the second user if each role in the second profile has a corresponding matching role in the first target role set.

In another aspect according to the present invention, a system for providing capabilities management and user administration comprises a component for assigning a first profile including at least one role to a first user, the first profile having a first privilege comprising a first function and having a corresponding first target role set comprising at least one role, a component for assigning a second profile comprising at least one role to a second user, and a component for providing the first user the ability to perform the first privilege on the second user if each role in the second profile has a corresponding matching role in the first target role set.

In yet another aspect according to the present invention, a computer-readable medium on which is stored a set of instructions for providing capabilities management and user administration, which when executed perform stages comprising assigning a first profile including at least one role to a first user, the first profile having a first privilege comprising a first function and having a corresponding first target role set comprising at least one role, assigning a second profile comprising at least one role to a second user, and providing the first user the ability to perform the first privilege on the second user if each role in the second profile has a corresponding matching role in the first target role set.

Both the foregoing general description and the following detailed description are exemplary and are intended to provide further explanation of the invention as claimed.

DETAILED DESCRIPTION OF PREFERRED EMBODIMENTS

Reference will now be made to various preferred embodiments according to this invention, examples of which are shown in the accompanying drawings and described below. In the drawings, the same reference numbers represent the same or similar elements in the different drawings whenever possible.

Consistent with an exemplary embodiment of the present invention, a system for providing capabilities management and user administration may comprise a component for assigning a profile to a first user, the profile comprising a plurality of roles, a component for providing the first user a first role included in the plurality of roles, and a component for granting the first user access to a first function of an application based on the first role. Moreover, the system may include a component for revoking the first role from the first user at least resulting in the first user being denied access to the first function, a component for providing the first user a second role included in the plurality of roles, and a component for granting the first user access to a second function of the application based on the second role.

In another embodiment, a system for providing capabilities management and user administration may comprise a component for assigning a first profile including at least one role to a first user, the first profile having a first privilege comprising a first function and having a corresponding first target role set comprising at least one role, a component for assigning a second profile comprising at least one role to a second user, and a component for providing the first user the ability to perform the first privilege on the second user if each role in the second profile has a corresponding matching role in the first target role set.

In yet another embodiment, a system for providing capabilities management and user administration may comprise a component for assigning a first profile including at least one role to a first user, the first profile having a first privilege comprising a first function and having a corresponding first target role set comprising at least one role and a component for providing the first user the ability to assign a second profile comprising the first target role set to a second user if the first privilege comprises an adding function.

Figure 6:
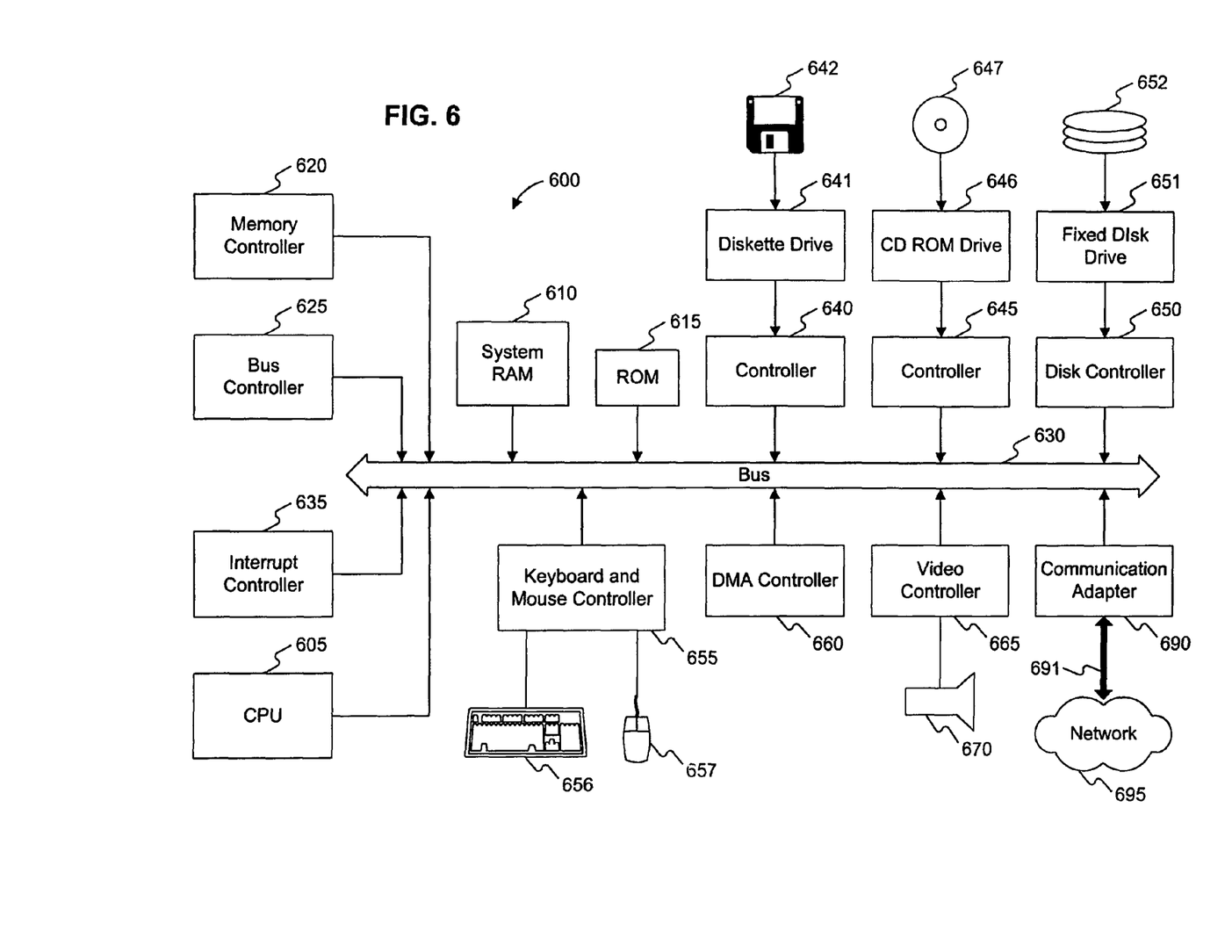
FIG. 6 is a functional block diagram of an exemplary computer system consistent with an embodiment of the present invention.

Consistent with such exemplary embodiments of the present invention, the aforementioned components may comprise, be disposed, or implemented within a computer system 600, as shown in FIG. 6, as described below. Computer system 600 is exemplary and other devices and systems may comprise the aforementioned components and still be consistent with embodiments of the present invention.

Figure 1:
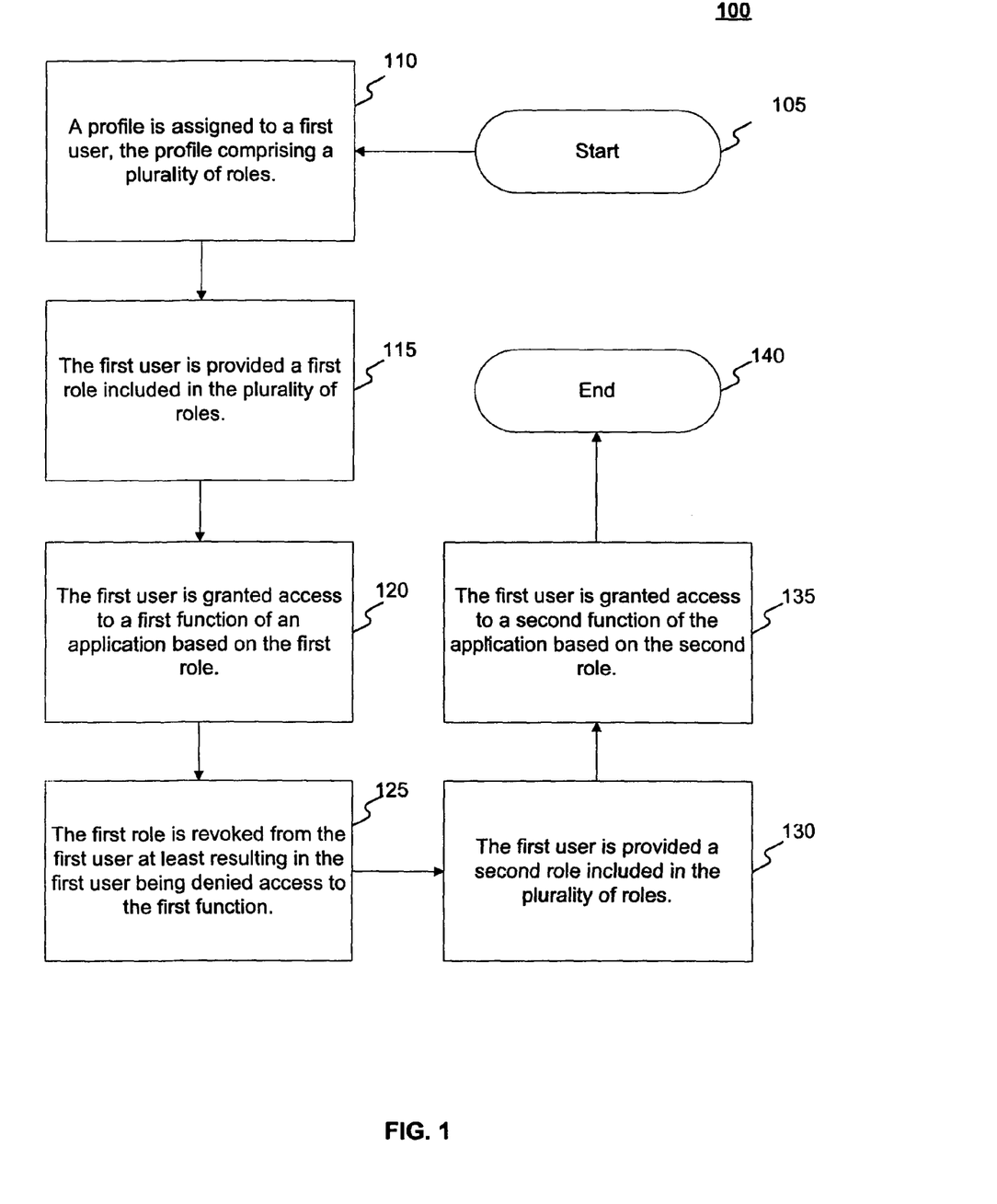
FIG. 1 is a flow chart of an exemplary method providing capabilities management and user administration consistent with an embodiment of the present invention.

FIG. 1 is a flow chart setting forth the general stages involved in exemplary method 100 for providing capabilities management and user administration. The implementation of the stages of exemplary method 100 in accordance with an exemplary embodiment of the present invention will be described in greater detail below. Exemplary method 100 begins at starting block 105 and proceeds to stage 110 where a profile is assigned to a first user, the profile comprising a plurality of roles. For example, a role may comprise an abstraction of a group of users who may have the same access privileges. Each role may be identified by a number called a role ID. In practice, a role may represent a business unit in an enterprise's hierarchical organization structure, a user's geographical location, or a specific functional type of users in a business unit of an enterprise. The aforementioned roles are exemplary and other roles may be used.

From stage 110 where the profile is assigned to the first user, exemplary method 100 continues to stage 115 where the first user is provided a first role included in the plurality of roles. For example, the first user may have more than one role attached to the profile, but at any given instance of time on a single login, the first user may work in the application with only one active role.

Once the first user is provided the first role included in the plurality of roles in stage 115, exemplary method 100 advances to stage 120 where the first user is granted access to a first function of an application based on the first role. In this way, access permissions to various functionalities in the application may be based on the first user's current role. In one example, there are two roles, r1 and r2, in the application in which role r1 has access to function f1 and role r2 has access to function f2. The user in this example may need to have access to both f1 and f2 because of a business need. A system administrator, who has privileges to add both r1 users and r2 users, may create a user ID for the first user and may assign both r1 and r2 to the created user ID. One of the roles, r1 for example, may be specified as the default role for when the first user logins with the given user ID. After the first user logins, the current active role of the first user may be the default role r1. Because the first user has role r1, a menu bar, for example, in the first user's working window may have a link to function f1, but not function f2, since the first user's current active role, r1, has no access to f2.

After the first user is granted access to the first function of an application based on the first role in stage 120, exemplary method 100 proceeds to stage 125 where the first role is revoked from the first user at least resulting in the first user being denied access to the first function. For example, if the user needs to access f2, the first user may click on a link for changing the current role from r1. As a result, the user's access to function f1 may be revoked.

From stage 125 where the first role is revoked from the first user, exemplary method 100 continues to stage 130 where the first user is provided a second role included in the plurality of roles. For example, upon clicking on the link for changing the current role to r2 as described above, the first user may be given access to function f2.

Once the first user is provided the second role, exemplary method 100 advances to stage 135 where the first user is granted access to a second function of the application based on the second role. For example, the menu bar of the first user's working window may change to have a link to function f2 associated with r2 instead of function f1 associated with r1. After the first user is granted access to the second function of the application based on the second role in stage 135, exemplary method 100 ends at stage 140.

Figure 2:
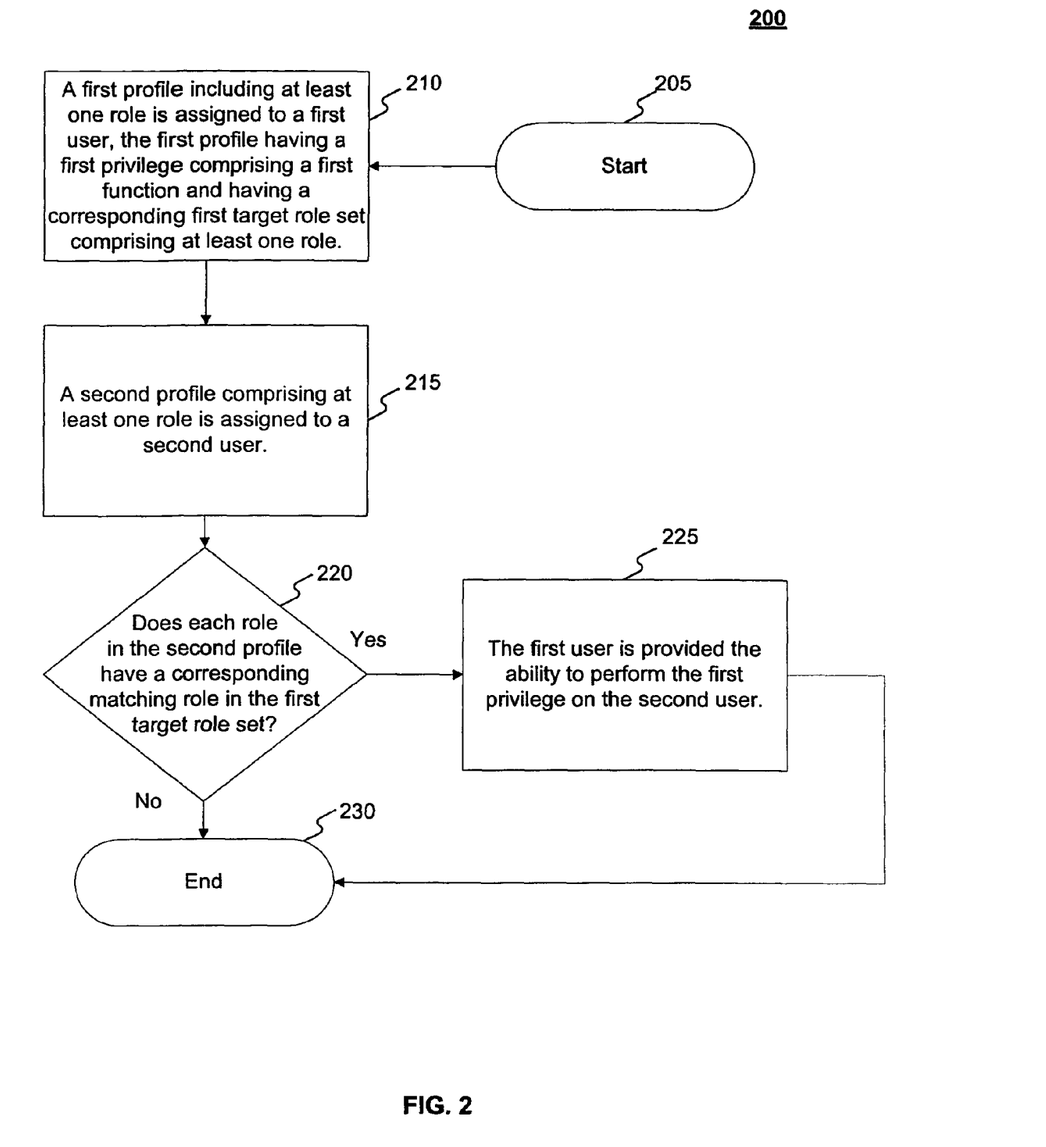
FIG. 2 is a flow chart of an exemplary method providing capabilities management and user administration consistent with another embodiment of the present invention.
Figure 4:
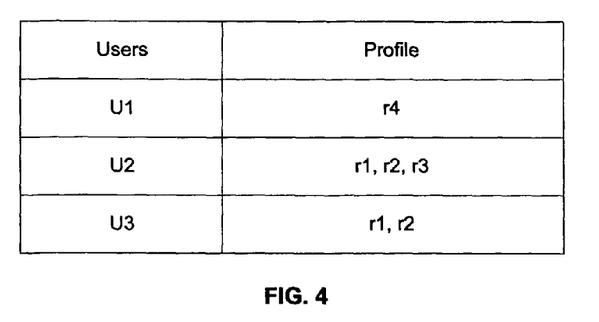
FIG. 4 illustrates exemplary user profiles consistent with embodiments of the present invention.
Figure 5:
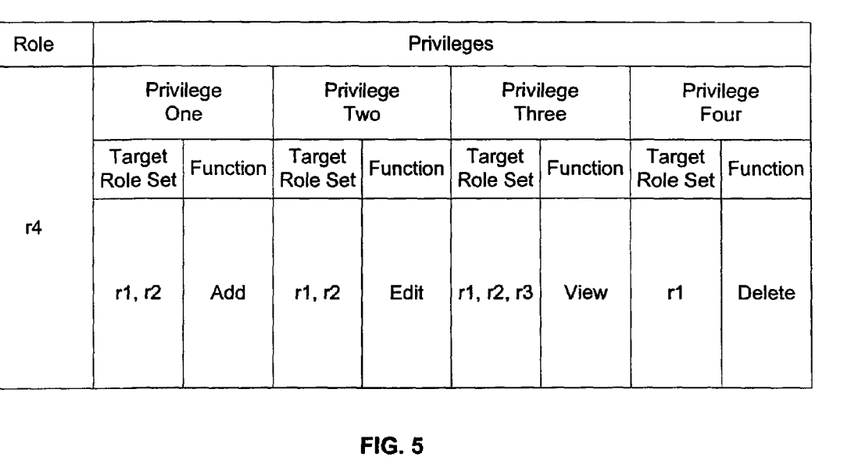
FIG. 5 illustrates exemplary privileges consistent with embodiments of the present invention.

FIG. 2 is a flow chart setting forth the general stages involved in another exemplary method 200 for providing capabilities management and user administration. The implementation of the stages of exemplary method 200 in accordance with an exemplary embodiment of the present invention will be described in greater detail below. Exemplary method 200 begins at starting block 205 and proceeds to stage 210 where a first profile including at least one role is assigned to a first user. The first profile may have a first privilege comprising a first function and a corresponding first target role set comprising at least one role. For example, as shown in FIG. 4, the first user may comprise user u1 having the first profile comprising role r4. Moreover, as shown in FIG. 5, the first profile, by comprising role r4, may have a plurality of privileges, for example, a privilege one, a privilege two, a privilege three, and a privilege four. Each of the aforementioned privileges may include a target role set and a function.

For example, as shown in FIG. 5, privilege one may include the target role set comprising roles r1, and r2 with the function comprising the adding function. The aforementioned privileges and functions are exemplary and other privileges and functions may be used.

From stage 210 where the first profile including at least one role is assigned to the first user, exemplary method 200 continues to stage 215 where a second profile comprising at least one role is assigned to a second user. For example, as shown in FIG. 4, the second user may comprise user u2 having the second profile comprising role r1, r2, and r3.

After the second profile comprising at least one role is assigned to the second user in stage 215, exemplary method 200 advances to decision block 220 where it is determined if each role in the second profile has a corresponding matching role in the first target role set. For example, the second profile may comprise U2's profile (r1, 2, r3) from FIG. 4. Furthermore, if the first privilege comprises privilege three of FIG. 5, the first target role set may comprise the target role set for privilege three (r1, r,2, r3) as shown in FIG. 5. This example results in a positive match because each role in the second profile has a corresponding matching role in the first target role set.

From decision block 220, if it is determined that each role in the second profile has a corresponding matching role in the first target role set, exemplary method 200 proceeds to stage 225 where the first user is provided the ability to perform the first privilege on the second user. For example, if the first privilege comprises privilege three of FIG. 5, user u1 can view the profile of user u2 because r4 (user u1's profile) has privilege to view all roles of user u2. However, if the first privilege comprises privilege two of FIG. 5, the target role set only contains only roles r1 and r2. In this example, user u1 cannot modify user u2's profile because r4 (user u1's profile) does not have privilege to edit all roles of user u2 since u2's profile includes role r3 in addition to roles r1 and r2. If at decision block 220, however, it was determined that that each role in the second profile does not have a corresponding matching role in the first target role set, or from stage 225 where the first user is provided the ability to perform the first privilege on the second user, exemplary method 200 ends at stage 230.

As another example, if the first privilege comprises privilege two of FIG. 5, user u1 can edit a user u3 having a profile of roles r1 and r2 (as shown in FIG. 4) because r4 (user u1's profile) has privilege to edit all roles of user u3. Further, if the first privilege comprises privilege four of FIG. 5, user u1 may not delete user u3 because r4 (user u1's profile) does not have privilege to delete role r2, which u3's profile includes.

Figure 3:
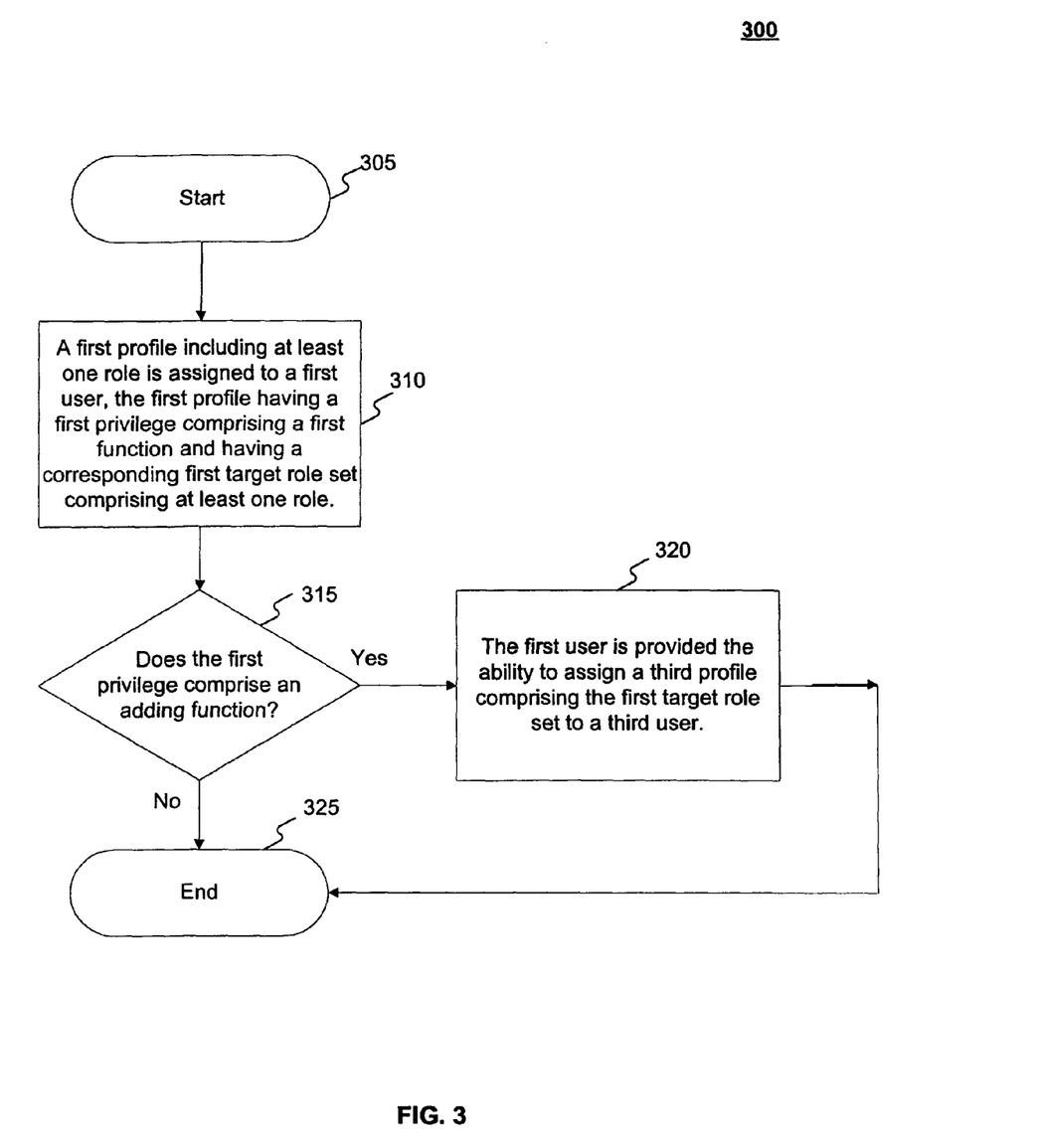
FIG. 3 is a flow chart of an exemplary method providing capabilities management and user administration consistent with yet another embodiment of the present invention.

FIG. 3 is a flow chart setting forth the general stages involved in yet another exemplary method 300 for providing capabilities management and user administration. The implementation of the stages of exemplary method 300 in accordance with an exemplary embodiment of the present invention will be described in greater detail below. Exemplary method 300 begins at starting block 305 and proceeds to stage 310 where a first profile including at least one role is assigned to a first user. The first profile may have a first privilege comprising a first function and a corresponding first target role set comprising at least one role. For example, as shown in FIG. 4, the first user may comprise user u1 having the first profile comprising role r4. Moreover, as shown in FIG. 5, the first profile, by comprising role r4, may have a plurality of privileges, for example, a privilege one, a privilege two, a privilege three, and a privilege four. Each of the aforementioned privileges may include a target role set and a function. For example, as shown in FIG. 5, privilege one may include the target role set comprising roles r1, and r2 with the function comprising the adding function. The aforementioned privileges and functions are exemplary and other privileges and functions may be used.

After the first profile including at least one role is assigned to the first user in stage 310, exemplary method 300 advances to decision block 315 where it is determined if the first privilege comprises an adding function. For example, the first privilege may comprise privilege one as shown in FIG. 5 that includes the add function. From decision block 315, if it is determined that the first privilege comprises the adding function, exemplary method 300 proceeds to stage 320 where the first user is provided the ability to assign a third profile comprising the first target role set to a third user. For example, user u1 may create a new user, u3 for example, and assign roles r1 and r2 to user u3's profile as shown in FIG. 4. User u1 may create user u3 with such a profile because r4 (user u1's profile) may have the privilege to add role r1 and r2 as shown in FIG. 5 with respect to privilege one. According to the example of FIG. 5, privilege one includes the adding function having a target role set of roles r1 and r2. If at decision block 315, however, it was determined that the first privilege does not comprise an adding function, or from stage 320 where the first user is provided the ability to assign the third profile comprising the first target role set to the third user, exemplary method 300 ends at stage 325.

As herein embodied and illustrated in FIG. 6 is a diagram of a system architecture for a computer system 600 with which the invention may be implemented. Although the description may refer to terms commonly used in describing particular computer systems, such as a personal computer, the description and concepts equally apply to other computer systems, such as handheld computing devices, network computers, workstations, and even mainframe computers having architectures dissimilar to FIG. 6.

Computer system 600 includes a central processing unit (CPU) 605, which may be implemented with a conventional microprocessor, a random access memory (RAM) 610 for temporary storage of information, and a read only memory (ROM) 615 for permanent storage of information. A memory controller 620 controls the RAM 610.

A bus 630 interconnects the components of computer system 600. A bus controller 625 controls the bus 630. An interrupt controller 635 receives and processes various interrupt signals from the system components.

Mass storage may be provided by diskette 642, CD ROM 447, or hard drive 652. Data and software may be exchanged with computer system 400 via removable media such as diskette 642 and CD ROM 647. Diskette 642 inserts into diskette drive 641 which, in turn, connects to bus 630 via a controller 640. Similarly, CD ROM 647 inserts into CD ROM drive 646 which, in turn, connects to bus 630 via controller 645. Hard disk 652 is part of a fixed disk drive 651 that connects to bus 630 by controller 650.

User input to computer system 600 may be provided by a number of devices. For example, a keyboard 656 and mouse 657 connect to bus 630 via controller 655. In addition, other input devices, such as a pen, a tablet, or speech recognition mechanisms, may connect to bus 630 and an appropriate controller and software. A direct memory access (DMA) controller 660 performs direct memory access to RAM 610. User output may be generated by a video controller 665 that controls video display 670.

Computer system 600 also includes a communications adaptor 690 that allows the system to be interconnected to additional computing resources via a local area network (LAN) or a wide area network (WAN), such as the Internet, schematically illustrated by bus 691 and network 695. Signals traveling through network 695 can generally be referred to as "carrier waves" that transport information. Although aspects of the present invention are described as being stored in memory in the form of instructions, those aspects may be stored on other computer-readable media, such as secondary storage devices like hard disks, floppy disks, or CD ROM, or other forms of RAM or ROM, or a carrier wave.

Operation of computer system 600 is generally controlled and coordinated by operating system software. The operating system controls allocation of system resources and performs tasks, such as memory management, process scheduling, networking, and services, among other things.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. Other embodiments of the invention will be apparent to those skilled in the art from consideration of the specification and practice of the embodiments disclosed herein. It is intended that the specification and examples be considered as exemplary only, with a true scope of the invention being indicated by the following claims.

What is claimed is:

1. A computer-implemented method for providing capabilities management and user administration, the method comprising the steps, performed by a computer, of:
   assigning a predefined profile to a first user, the profile comprising a predetermined plurality of roles and a first privilege, the first privilege comprising a first function and a first target role set;
   receiving a first request from the first user to log in;
   in response to the first request, assigning one of the roles as a first role to the first user;
   receiving a second request from the first user to access a first function of an application;
   in response to the second request, granting access to the first function of the application based on the first role;
   receiving a third request from the first user to perform the first function of the first privilege on a second user;
   in response to the third request, performing the first function of the first privilege on the second user when the first target role set of the first privilege contains a corresponding matching role for each role of the profile of the second user;
   receiving a fourth request from the first user to change roles; and
   in response to the fourth request, revoking the first role from the first user and assigning one of the plurality of roles of the first user as a second role to the first user, wherein the profile continues to comprise the revoked role.

2. The method of claim 1, wherein one of the roles comprises one of a unit within an enterprise, a geographic location, or a functional type of user within an enterprise.

3. The method of claim 1, further comprising the steps performed by the computer of:
   receiving a fifth request from the first user to access a second function of the application; and
   in response to the fifth request, granting access to the second function of the application based on the second role.

4. A computer-implemented method for providing capabilities management and user administration, the method comprising the steps, performed by a computer, of:
   assigning a predefined profile to a first user, the profile comprising a predetermined plurality of roles and a first privilege, the first privilege comprising a first function and a first target role set;
   receiving a first request from the first user to log in;
   in response to the first request, assigning one of the roles as a first role to the first user;
   receiving a second request from the first user to access a first function of an application;
   in response to the second request, granting access to the first function of the application based on the first role;
   receiving a third request from the first user to perform the first function of the first privilege on a second user;
   in response to the third request, performing the first function of the first privilege on the second user when the first target role set of the first privilege contains a corresponding matching role for each role of the profile of the second user;
   receiving a fourth request from the first user to change roles;
   in response to the fourth request, revoking the first role from the first user and assigning one of the plurality of roles of the first user as a second role to the first user, wherein the profile continues to comprise the revoked role;
   receiving a fifth request from the first user to assign a profile to a second user; and
   in response to the fifth request, allowing the first user to assign a profile having roles corresponding to the first target role set to the second user, when the first function of the first privilege comprises an adding function.

5. The method of claim 4, wherein the first function of the first privilege comprises at least one of adding, editing, viewing, or deleting a second user.

6. A computer-based system for providing capabilities management and user administration, the system comprising:
   a storage device; and
   a processor coupled to the storage device, wherein the storage device stores a program for controlling the processor, and wherein the processor, being operative with the program, is configured to:
      assign a predefined profile to a first user, the profile comprising a predetermined plurality of roles and a first privilege, the first privilege comprising a first function and a first target role set;
      receive a first request from the first user to log in;
      in response to the first request, assign one of the roles as a first role to the first user;
      receive a second request from the first user to access a first function of an application;
      in response to the second request, grant access to the first function of the application based on the first role;
      receive a third request from the first user to perform the first function of the first privilege on a second user;

in response to the third request, perform the first function of the first privilege on the second user when the first target role set of the first privilege contains a corresponding matching role for each role of the profile of the second user;

receive a fourth request from the first user to change roles; and in response to the fourth request, revoke the first role from the first user and assign one of the plurality of roles of the first user as a second role to the first user, wherein the profile continues to comprise the revoked role.

7. The system of claim 6, wherein the first function of the first privilege comprises at least one of adding, editing, viewing, or deleting a second user.

8. The system of claim 6, wherein one of the roles comprises at least one of a unit within an enterprise, a geographic location, or a functional type of user within an enterprise.

9. The system of claim 6, wherein the processor is further configured to:

receive a fifth request from the first user to access a second function of the application; and in response to the fifth request, grant access to the second function of the application based on the second role.

10. The system of claim 6, wherein the processor is further configured to:

receive a fifth request from the first user to assign a profile to a second user; and in response to the fifth request, allow the first user to assign a profile having roles corresponding to the first target role set to the second user, when the first function of the first privilege comprises an adding function.

* * * * *